April 7, 1953  P. H. NETHERWOOD  2,634,314
SEALED ELECTRICAL ASSEMBLY
Filed May 3, 1950
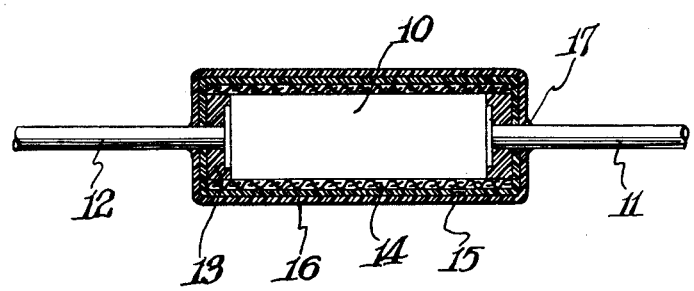
INVENTOR
PAUL H. NETHERWOOD
BY
*Arthur J. Connolly*
HIS ATTORNEY Patented Apr. 7, 1953

2,634,314

UNITED STATES PATENT OFFICE 2,634,314

SEALED ELECTRICAL ASSEMBLY

Paul H. Netherwood, North Adams, Mass., assignor to Sprague Electric Company, North Adams, Mass., a corporation of Massachusetts Application May 3, 1950, Serial No. 159,707

3 Claims. (Cl. 175—41)

This invention relates to improved electrical devices and more specifically refers to inexpensive sealing arrangements for electrical devices, particularly capacitors.

Paper capacitors are used extensively in the communications industry for by-passing, coupling, and other purposes. In most applications the complete assembly of a radio, for example, is not hermetically sealed and the capacitors therein will be subjected to atmospheres of varying humidity and temperature. It is therefore essential that the capacitor section itself be protected from the humidity since in most instances the presence of moisture is extremely undesirable in the dielectric used to insulate the capacitor electrodes. As a positive protection against the presence of moisture within the capacitor per se, metal cans, thermosetting resin casings and the like have been employed and are indeed widely used. Nevertheless, a great majority of applications are such that the cost of these premium types cannot be tolerated. The so-called paper tubular capacitor which employs a cardboard tube casing with one or two wax dips is used wherever possible because of its lower cost. Unfortunately, however, it is difficult to coat the capacitor assembly with a wax which will maintain its position throughout rough handling and use. Most of the harder waxes which are good for high temperatures chip or peel at low temperatures. The alternative softer waxes which are good for low temperature toughness often become sticky at the higher temperatures. Thus, considerable difficulty is encountered in obtaining a moisture-resistant coating which can be handled without dripping, chipping, or other failure over the rather wide temperature range encountered in shipment and in use, for example, from plus 100° C. down to perhaps −20° C.

It is an object of the present invention to overcome the related and foregoing disadvantages. It is a further object to produce new and inexpensive moisture-resistant electrical capacitors and other devices. Additional objects will become apparent from the following description and claims.

These objects are attained in accordance with the present invention wherein there is produced an electrical assembly comprising an electrical device housed in an insulating container, from which terminal wires extend, a layer of a soft adherent moisture resistant material selected from the class containing waxes and greases coating said container and a portion of said terminal wires, and a thin outer layer of an elastic oil-resistant resin coating and confining said moisture resistant material and extending at least $\frac{1}{16}$" beyond said material on said terminal wires, said resin being substantially incompatible with said wax.

In one of its preferred embodiments, the invention is concerned with an electrical capacitor assembly comprising a rolled paper capacitor housed in a paper tube whose ends are filled with a solid material with melting point in excess of 100° C., terminal wires protruding beyond said ends, a coating of a predominantly hydrocarbon wax with a penetration number of at least 15 (ASTM designation D–937–47T, A. S. T. M. Standards 1947 Supplement Part III-A, petrolatum penetration test with 100 g. weight instead of 150 g. weight) at 77° F. completely over said tube and ends and a limited portion of said terminal wires, a cellulose acetate resin coating about 5 mils in thickness covering and confining said wax and extending about $\frac{1}{8}$" beyond said wax upon said terminal wires. The end sealing solid material may consist of a sealing cement comprising, before curing, about 70% of a refractory ceramic material, containing no electrolyte or ionizable material, about 15% of a water dispersible melamine-formaldehyde condensation resin, and about 15% of water or a readily vaporizable water-soluble solvent for said resin. Another material, having a melting point in excess of 100° C., that may be satisfactorily used to fill the ends of the paper tube comprises about 50% finely divided silica and about 50% of a mixture comprising a minor portion of a stearic acid amide and a major portion of a coumarone-indene resin, all dispersed in a sufficient quantity of a hydrocarbon solvent to give the material plasticity.

The invention is also concerned with the process for producing the sealed electrical assemblies of the invention.

I have discovered that a simple, inexpensive and extremely effective method for overcoming the disadvantages of prior art wax-dipped capacitors, coils, and the like can be overcome by employing a base coating of a soft moisture-resistant wax or grease with a coating of a substantially incompatible elastic resin. By incompatible I mean that it will not be appreciably dissolved by or dissolve the underlying grease or wax coating during or after the resin application. The soft wax or grease adheres very well to the capacitor housing and provides a barrier layer which substantially eliminated penetration of transmission of moisture. The outer resin coating serves to locate the soft wax or grease on the capacitor assembly and to protect it from external mechanical damage and also to eliminate any possibility of sticking of adjacent capacitors, dripping, etc. The elastic resin need be employed in only limited thickness since it is not relied on for the moisture-resistance of the assembly.

Since it is difficult to find a wax which has equally good adherence to paper and to metal, I may choose a wax with good adhesion to paper. In this case, I then choose a lacquer which adheres well to metal and am careful to see that the lacquer coats higher on the terminal wires or elements, preferably by at least $\frac{1}{16}''$ than the wax, this procedure blocking the path of any moisture down along the surface of the wires. It is to be understood that in most cases, the portions of the lead wires used for circuit connection are not coated.

Waxes which may be employed in accordance with the present invention are preferably predominantly hydrocarbon in nature, although other materials may be employed, such as silicone greases and the like. My invention broadly encompasses waxes and greases with a penetration number of at least 10 at 77° F. as determined by the previously disclosed ASTM petrolatum penetration test. For optimum results, the penetration number is at least 15. The penetration number as referred to throughout the present specification and claims shall be obtained in accordance with the above specified ASTM testing procedure. Microcrystalline hydrocarbon waxes, low molecular weight polyethylene, gelled mineral oil, hard waxes with hydrocarbon plasticizers and other materials which are excellent moisture barriers are satisfactory.

The outer resin coating should be substantially incompatible with the underlying wax coating, and tough and durable in thin films. I use the expression "elastic" to define the resin and this means that in the thin layers of the invention, it will stretch to distribute shocks and to permit differential expansion of the other components without seal rupture. Cellulosic resins and polyvinyl halides represent the preferred resin lacquer materials for use herein because the solvents therefor will not readily dissolve hydrocarbon waxes and the resulting resin film possesses remarkable toughness and durability even in thin layers. A preferred class of cellulosic resin is the cellulose ester series, for example, cellulose acetate, cellulose acetate butyrate, and cellulose propionate. Cellulose nitrate is suitable but often undesirable because of its inflammability. Cellulose ethers such as ethyl cellulose can be employed although their compatibility with hydrocarbon waxes may in some instances prevent their use. Polyvinyl chloride is a suitable polyvinyl halide resin.

The resin insulation may be applied by spraying or other means, but I prefer to employ a dip coating at low temperature in a resin solution or gel lacquer such as provided with acetone, ethyl acetate and the like in the case of cellulose acetate as a base resin. Alternately the resin plasticizer may be used as a solvent, if solvation can be accomplished at moderate temperatures. The thickness of the final solid resin film should be between about 1 mil and 20 mils. Five mils is ordinarily an ample thickness in accordance with the present invention. As indicated previously, the resin and resin plasticizer should be incompatible with the coating wax. The resin coating prevent cold flow of the wax or grease, and locates the latter in place.

The wax or grease thickness is dependent upon the nature of the substratum. With fibrous containers, such as paper, the coating must be thick enough to cover all extended or loose fibers; with smooth surfaces, such as polystyrene, or glassine paper, a thin coating will suffice. Ordinarily the thickness varies from about 3 to about 50 mils. The softer waxes are preferred since they readily accommodate surface irregularities in the substratum.

The invention will be further and representatively described with reference to the appended drawing in which 10 represents a rolled capacitor section to the ends of which are soldered terminal wires 11 and 12. The capacitor is housed in a tubing 14 which may be of paper or other tough material such as cellulose acetate, polystyrene, etc. It is desirable but not necessary that it be moisture resistant. The ends of the tube are filled with potting compound as indicated at 13 to firmly secure the capacitor 10 within the tubing 14. The sealing or filling compound is ordinarily a high melting wax or resin having substantial inorganic filler content.

Over this assembly is provided coating 15 of a soft moisture resistant wax or grease as previously described. This serves to render the assembly substantially moisture resistant. The elastic resin film 16 protects wax coating 15 from external damage, and cold flow about the capacitor assembly. The resin extends beyond the coating 15 upon the lead wires such as 11 for at least $\frac{1}{16}''$ as indicated at 17. Being oil resistant, it will prevent dripping of oil impregnants at higher temperatures, if the device is impregnated with a dielectric oil.

The resulting structure can be handled and operated over the conventional temperature range without failure due to moisture penetration or flowing of the wax.

The resin film is of sufficient thinness and elasticity to permit expansion thereof to accommodate internal expansion of the capacitor and housing elements without breaking away of the resin from the terminal wires.

Preferred examples of the invention are (a) rolled paper capacitors housed in heavy paper tubes, coated in a soft microcrystalline wax and provided with an outer resin film of polyvinyl chloride and (b) rolled paper capacitors housed in glassine paper tubes with a coating of a mineral oil gelled with polyethylene wax and a resin coating consisting of cellulose acetate.

As many different embodiments of this invention may be made without departing from the spirit and scope hereof, it is to be understood that the invention is not limited to the specific embodiments hereof except as defined in the appended claims.

What is claimed is:

1. An electrical assembly comprising an electric capacitor housed in an insulating container from which terminal leads of said capacitor extend, a layer of an adherent moisture resistant material selected from the class consisting of hydrocarbon waxes and greases having a penetration number of at least 10 enveloping said container and the adjacent portions of said terminal leads, and an outer layer of elastic resin not more than about 20 mils thick coating and confining said moisture resistant material and extending at least $\frac{1}{16}''$ beyond said material on said terminal wires, said resin being substantially incompatible with said moisture-resistant material.

2. An electrical capacitor assembly comprising a wound capacitor housed in a cellulosic tube with a sealing material at the ends of said tube and from which sealed ends terminal wires extend, a coating of a moisture-resistant, predominantly hydrocarbon wax with a penetration number of at least 10 covering said tube and sealing material and a portion of said terminal wires, and an elastic coating of cellulose ester resin between about 1 mil and about 20 mils in thickness covering said wax and extending at least ⅛" beyond said wax on said terminal wires.

3. An electrical capacitor assembly comprising a rolled paper capacitor housed in a paper tube whose ends are filled with a solid material with melting point in excess of 100° C., terminal wires projecting out through said ends, a coating of predominantly hydrocarbon wax with a penetration number of at least 15 over said tube and ends and a limited portion of said terminal wires, a cellulose acetate resin coating about 6 mils in thickness covering and locating said wax and extending about ⅛" beyond said wax upon said terminal wires.

PAUL H. NETHERWOOD.

REFERENCES CITED

The following references are of record in the file of this patent:

UNITED STATES PATENTS

| Number | Name | Date |
| --- | --- | --- |
| 1,883,932 | Kazenmaier | Oct. 25, 1932 |
| 1,929,396 | Benkelman | Oct. 3, 1933 |
| 2,160,646 | Coutlee | May 30, 1939 |
| 2,207,707 | Baer | July 16, 1940 |
| 2,486,751 | McMichael | Nov. 1, 1949 |

FOREIGN PATENTS

| Number | Country | Date |
| --- | --- | --- |
| 502,039 | Great Britain | Mar. 9, 1939 |
| 569,202 | Great Britain | May 11, 1945 |